Patented June 1, 1943

2,320,924

UNITED STATES PATENT OFFICE 2,320,924

TRANSLUCENT POLYMERIC METHACRYLIC ESTERS

Warren H. Gift, Bristol, Pa., assignor to Röhm & Haas Company, Philadelphia, Pa.

No Drawing. Application May 8, 1939,
Serial No. 272,449

9 Claims. (Cl. 260—42)

This invention relates to a process for producing cast objects of translucent polymeric material and to the product obtained thereby. It relates more particularly to sheets of polymeric methyl methacrylate or styrene which are rendered translucent by the presence of finely dispersed particles of a polymer of similar material having an index of refraction different from that of the preponderant constituent of the sheet.

It has been found that, if a small amount of polymeric styrene or polymeric vinyl acetate, for example, is dissolved in monomeric methyl methacrylate and the solution exposed to polymerizing influences, the dissolved polymer gradually becomes less and less soluble as polymerization proceeds and finally precipitates in the form of extremely fine particles uniformly dispersed throughout the mass of polymer. The same thing happens if polymeric methyl methacrylate or polyvinyl acetate is dissolved in monomeric styrene and the latter polymerized.

The amount of polymer dissolved in the monomer determines the degree of translucency and even relatively small amounts yield sheets which are practically pure white in color. The total light transmisison also depends on the amount of dispersed polymer, decreasing with increasing proportions thereof, as shown by the following table. The measurements were made on pieces of polymethyl methacrylate, containing the indicated amount of polystyrene, 0.10" thick with a parallel beam of white light.

| Per cent polystyrene | Per cent transmitted | Per cent reflected | Optical efficiency |
|---|---|---|---|
| 0.25 | 83 | 15 | 98 |
| 0.50 | 75 | 22 | 97 |
| 1.25 | 64 | 36 | 100 |
| 2.50 | 55 | 48 | 103 |
| 5.00 | 43 | 59 | 102 |
| 10.00 | 31 | 69 | 100 |

There is a possible error of about 1% in both measurements which accounts for the two totals over 100%.

The sheets are prepared by dissolving the polymer in the monomeric liquid, adding a small amount of catalyst such as benzoyl peroxide and polymerizing the monomer between two sheets according to the method described in U. S. Patent No. 2,091,615.

The invention may be illustrated by the following examples but it is not limited to the exact proportions or materials shown as it may be otherwise practiced within the scope of the appended claims.

Example 1

0.25 part of polystyrene and 0.05 part of benzoyl peroxide are dissolved in a mixture of 100 parts of methyl methacrylate and 15 parts of ethyl acrylate. This solution is then placed in a mold made of two sheets of glass held together by plastic spacers (see U. S. Patent No. 2,091,615) and heated at about 100° C. until a thick syrup is formed. It is then cooled to about 50 or 60° C. and the temperature increased gradually over a period of about eighteen hours, as polymerization proceeds, up to about 125-130° C. When polymerization is complete, the sheet is removed from the mold. The sheet thus made is pure white and translucent.

Example 2

A solution of 10 parts of polymethyl methacrylate in 100 parts of monomeric styrene is prepared and polymerized as described in Example 1. The resulting sheet is pure white and translucent but transmits less light than the sheet made according to Example 1 because it contains a larger proportion of the dispersed polymer.

Example 3

A solution of 5 parts of polystyrene, 100 parts of monomeric methyl methacrylate is prepared and polymerized as described in Example 1. The resulting sheet is pure white and translucent, but transmits less light than the sheet made according to Example 1.

Example 4

A solution of 94 parts of polyvinyl acetate in a mixture of 800 parts of methyl methacrylate and 200 parts of ethyl acrylate is prepared and polymerized as described in Example 1. The resulting sheet is pure white and translucent.

The translucent sheets may be made in any desired color by dissolving an appropriate dye in the monomeric liquid prior to polymerization.

Generally speaking, plasticizers cannot be used since they are usually solvents for the polymers and would tend to dissolve both the continuous and dispersed polymer, thus making an optically homogeneous sheet, and this would defeat the object of the invention. However, in some cases a soft or flexible material may be required and this may be obtained by using as the monomeric liquid a compound which yields a soft polymer or by using a mixture of two polymerizable liquids, one of which yields a soft polymer. In this way sheets conforming to any requirements of flexibility can be prepared. Appropriate materials for regulating the flexibility are the higher alkyl esters of acrylic and methacrylic acids.

The solution of polymer in monomer may also be polymerized in molds of other shapes, particularly in the form of tubes or of rods, in the latter instance according to the process disclosed in the co-pending application of W. S. Johnson, Serial No. 261,201, filed March 11, 1939.

I claim:

1. Uniformly translucent sheets of polymers of styrene and methyl methacrylate, consisting of a fine dispersion of one of said polymers in a continuous sheet of the other polymer.

2. Uniformly translucent sheets of polymers of styrene and methyl methacrylate, consisting of a fine dispersion of polystyrene in a continuous sheet of polymethyl methacrylate.

3. Translucent sheets of polystyrene and a joint polymer of methyl methacrylate and a minor proportion of a lower alkyl ester of acrylic acid, consisting of a fine dispersion of the polystyrene in a continuous sheet of the joint polymer.

4. Translucent sheets of polystyrene and a joint polymer of methyl methacrylate and a minor proportion of ethyl acrylate, consisting of a fine dispersion of the polystyrene in a continuous sheet of the joint polymer.

5. Uniformly translucent cast objects of a polymer from the group consisting of polystyrene and polyvinylacetate, and a polymer from the group consisting of the polymeric lower esters of acrylic and methacrylic acids, said object comprising a fine dispersion of at least one member of one of said groups in a continuous phase of at least one member of the other group.

6. Uniformly translucent cast objects comprising a fine dispersion of at least one polymer, from the group consisting of polyvinylacetate and polystyrene, in a continuous phase of at least one polymer from the group consisting of the polymeric lower alkyl esters of acrylic and methacrylic acids.

7. Uniformly translucent cast objects comprising a fine dispersion of at least one polymer from the group consisting of the polymeric lower esters of acrylic and methacrylic acids, in a continuous phase of at least one polymer from the group consisting of polystyrene and polyvinylacetate.

8. The process of preparing uniformly translucent cast objects which comprises dispersing a polymer from the group consisting of polystyrene and polyvinylacetate in a member of the group consisting of the monomeric lower esters of acrylic and methacrylic acids, casting the dispersion in a mold, subjecting the dispersion to polymerizing conditions until polymerization is complete and removing said translucent object from the mold.

9. The process of preparing uniformly translucent cast objects which comprises dispersing a polymer from the group consisting of the polymeric lower alkyl esters of acrylic and methacrylic acids in a member of the group consisting of a monomeric styrene and vinylacetate, casting the dispersion in a mold, subjecting the dispersion to polymerizing conditions until polymerization is complete, and removing said translucent object from the mold.

WARREN H. GIFT.